(12) United States Patent
Hakola et al.

(10) Patent No.: US 12,184,578 B2
(45) Date of Patent: Dec. 31, 2024

(54) SUPPORTING A NARROW SERVING BEAM IN A HIERARCHICAL BEAM CONFIGURATION

(71) Applicant: Nokia Technologies Oy, Espoo (FI)

(72) Inventors: Sami Hakola, Kempele (FI); Timo Koskela, Oulu (FI); Juha Karjalainen, Sotkamo (FI); Mihai Enescu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 366 days.

(21) Appl. No.: 17/791,097

(22) PCT Filed: Feb. 5, 2021

(86) PCT No.: PCT/IB2021/050972
§ 371 (c)(1),
(2) Date: Jul. 6, 2022

(87) PCT Pub. No.: WO2021/161143
PCT Pub. Date: Aug. 19, 2021

(65) Prior Publication Data
US 2023/0036639 A1 Feb. 2, 2023

Related U.S. Application Data

(60) Provisional application No. 62/976,851, filed on Feb. 14, 2020.

(51) Int. Cl.
*H04B 7/06* (2006.01)
*H04B 7/08* (2006.01)
(Continued)

(52) U.S. Cl.
CPC ......... *H04L 5/0051* (2013.01); *H04B 7/0626* (2013.01); *H04B 7/0695* (2013.01);
(Continued)

(58) Field of Classification Search
CPC .. H04B 7/06968; H04B 7/046; H04B 7/2603; H04B 7/0626; H04B 17/328; H04L 27/261; H04L 27/2613; H04J 11/0079
See application file for complete search history.

(56) References Cited

U.S. PATENT DOCUMENTS

2017/0207845 A1    7/2017  Moon et al.
2019/0052443 A1*   2/2019  Cheng .................. H04L 5/0023
(Continued)

FOREIGN PATENT DOCUMENTS

WO    2019/029743 A1    2/2019
WO    2020/226611 A1    11/2020
WO    2021/053650 A1    3/2021

OTHER PUBLICATIONS

"New WID: Further enhancements on MIMO for NR", 3GPP TSG RAN Meeting #86, RP-193133, Agenda: 9.1.1, Samsung, Dec. 9-12, 2019, 5 pages.
(Continued)

*Primary Examiner* — Salvador E Rivas
(74) *Attorney, Agent, or Firm* — Robert P. Michal, Esq.; Carter, DeLuca & Farrell LLP (57) ABSTRACT

Systems, methods, apparatuses, and computer program products for supporting a narrow serving beam in a hierarchical beam configuration. For example, certain embodiments may provide a UE that may receive, from a network node, information of a quasi co-location (QCL) configuration of self-contained, aperiodic, and/or semi-persistent tracking reference signals (TRSs) for sub-beams, where a source for one or more TRSs may be channel state information (CSI-RS) without repetition. In addition, the UE may determine these TRSs as self-contained, for which there are no associated periodic TRSs, if there is a TRS configured for an SSB sub-beam.

1 Claim, 4 Drawing Sheets

(51) Int. Cl.
*H04L 5/00* (2006.01)
*H04L 27/26* (2006.01)
*H04J 11/00* (2006.01)

(52) U.S. Cl.
CPC ......... *H04B 7/06968* (2023.05); *H04B 7/088* (2013.01); *H04L 27/261* (2013.01); *H04J 11/0079* (2013.01)

(56) References Cited

U.S. PATENT DOCUMENTS

| | | | |
|---|---|---|---|
| 2019/0104005 A1* | 4/2019 | Kim | H04L 5/0051 |
| 2019/0165880 A1* | 5/2019 | Hakola | H04L 1/1854 |
| 2019/0215117 A1 | 7/2019 | Lee et al. | |
| 2019/0356444 A1* | 11/2019 | Noh | H04W 72/23 |
| 2020/0112498 A1* | 4/2020 | Manolakos | H04J 13/0062 |
| 2020/0252891 A1* | 8/2020 | Chendamarai Kannan | H04W 74/0808 |
| 2020/0351055 A1* | 11/2020 | Manolakos | H04L 5/0053 |
| 2021/0329517 A1* | 10/2021 | Noh | H04L 5/0048 |

OTHER PUBLICATIONS

"3rd Generation Partnership Project; Technical Specification Group Radio Access Network; NR; Physical layer procedures for data (Release 15)", 3GPP TS 38.214, V15.7.0, Sep. 2019, pp. 1-106.

"On beam management in NR—procedures", 3GPP TSG-RAN WG1 #86 Bis, R1-1610239, Agenda: 8.1.4.1, Nokia, Oct. 10-14, 2016, 4 pages.

"3rd Generation Partnership Project; Technical Specification Group Radio Access Network; NR; NR and NG-RAN Overall Description; Stage 2 (Release 16)", 3GPP TS 38.300, V16.0.0, Dec. 2019, pp. 1-101.

"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

International Search Report and Written Opinion received for corresponding Patent Cooperation Treaty Application No. PCT/IB2021/050972, dated Apr. 26, 2021, 16 pages.

"Corrections related to TRS", 3GPP TSG RAN WG1 Meeting 92, R1-1802757, Agenda: 7.1.2.3.6, Ericsson, Feb. 26-Mar. 2, 2018, 15 pages.

"Summary of QCL", 3GPP TSG RAN WG1 #92, R1-1803328, Agenda: 7.1.2.3.7, Nokia, Feb. 26-Mar. 2, 2018, 31 pages.

* cited by examiner

SUPPORTING A NARROW SERVING BEAM IN A HIERARCHICAL BEAM CONFIGURATION

RELATED APPLICATION

This application claims priority to PCT Application No. PCT/IB2021/050972, filed on Feb. 5, 2021, which claims priority to U.S. Provisional Application No. 62/976,851, filed on Feb. 14, 2020, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for supporting a narrow serving beam in a hierarchical beam configuration.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

BRIEF DESCRIPTION OF THE DRAWINGS

For proper understanding of example embodiments, reference should be made to the accompanying drawings, wherein.

DETAILED DESCRIPTION

According to some aspects, there is provided the subject matter of the independent claims. Some further aspects are defined in the dependent claims. The embodiments that do not fall under the scope of the claims are to be interpreted as examples useful for understanding the disclosure. It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for supporting a narrow serving beam in a hierarchical beam configuration is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Enhancements to multiple input, multiple output (MIMO) for NR may be further developed with respect to beam management related objectives, such as facilitating more efficient (lower latency and overhead) downlink (DL)/uplink (UL) beam management to support higher intra- and L1/L2-centric inter-cell mobility and/or a larger number of configured transmission configuration indicator (TCI) states, facilitating UL beam selection for UEs equipped with multiple panels (considering UL coverage loss mitigation due to maximum permissible exposure (MPE) based on UL beam indication with the unified TCI framework for UL fast panel selection), and/or the like.

Beam Management may include a set of functionalities to assist a UE with setting its receive (RX) and transmit (TX) beams for downlink receptions and uplink transmissions, respectively. The functionalities can be categorized into four general categories: 1) beam indication, which may include assisting the UE with setting its RX and TX beams properly for the reception of DL signals and transmission of UL signals, respectively; 2) beam acquisition, measurements, and reporting, which may include procedures for providing a network node (e.g., a gNB) information about feasible DL and UL beams for the UE; 3) beam recovery, which may provide for rapid link reconfiguration against sudden blockages (e.g., fast re-aligning of network node (e.g., gNB) and UE beams); and 4) beam tracking and refinement, which may include a set of procedures to refine network node (e.g., gNB) and UE side beams.

Regarding downlink beam management and/or beam acquisition, measurements and reporting, the following beam management procedures may be supported within one or multiple transmit receive points (TRPs): 1) procedure P-1; procedure P-2; and procedure P-3. P-1 may be used to enable UE measurement on different TRP TX beams to support selection of TRP TX beams/UE RX beams. For beamforming at a TRP, P-1 may include an intra/inter-TRP TX beam sweep from a set of different beams. For beamforming at a UE, P-1 may include a UE RX beam sweep from a set of different beams. P-2 may be used to enable UE measurement on different TRP TX beams to possibly change the inter/intra-TRP Tx beams. P-2 may be performed on a smaller set of beams for beam refinement than in P-1 (in some cases P-2 can be a specific case of P-1). P-3 may be used to enable UE measurement on the same TRP TX beam to change the UE RX beam in the case where the UE can use beamforming.

Regarding downlink beam indication, a quasi-colocation (QCL) indication functionality has been defined. The principle of receiving certain physical signals or physical channels is that the UE is either configured with, or the UE implicitly determines, a source/reference signal (RS) that the UE has received and measured earlier, which may define how to set a RX beam for the reception of the downlink (target) physical signal or channel to be received. To provide the UE with QCL characteristics for the target signal (to be received), a TCI framework has been defined. The UE can be configured with TCI state(s) to provide the UE with source RS(s) for determining QCL characteristics. In a single TRP case, each TCI state may include one or two source RSs that may provide the UE with QCL TypeA, TypeB, TypeC, and/or TypeD parameters. Different types may provide the parameters as follows: 1) QCL-TypeA may provide doppler shift, doppler spread, average delay, and delay spread parameters; 2) QCL-TypeB may provide doppler shift and doppler spread parameters; 3) QCL-TypeC may provide doppler shift and average delay parameters; and 4) QCL-TypeD may provide a spatial RX parameter.

There may be certain relationships between QCL source RSs, target signals, and channels to be received in DL. CSI-RS for time and frequency tracking, which may be periodic TRS (P-TRS), may be the primary QCL source RS for the reception of the target signals, like CSI-RS for CSI acquisition and for physical downlink control channel (PDCCH) and physical downlink shared channel (PDSCH) reception. Since it is not possible to configure CSI-RS without repetition (during P-2) as a QCL source for a target P-TRS to determine suitable sub-beams for the P-TRS under wider synchronization signal and physical broadcast channel (PBCH) block or synchronization signal block (SSB) beams (not even in-directly in the chain of the QCL sources), the transmit beam for P-TRS may be the same as for SSB beams. Even though CSI-RS with repetition (P-3) can be configured as a QCL-TypeD source for the P-TRS, since there is no CSI resource indicator (CRI) reporting from CSI-RS with repetition (P-3), it is not possible to define more narrow beams for the P-TRS than SSB beams (other than via blind guessing by a network node (e.g., a gNB)).

When a network node uses a large antenna array (e.g., 16×16 or 32×16 antennas), the beam width difference between SSB beams (wide beam) and PDCCH/PDSCH beams may be large. Thus, the discrepancy between the properties of a P-TRS beam (wide) and the narrow PDCCH/PDSCH beams may have a negative impact on the performance of the PDCCH/PDSCH reception (as the UE would use channel estimation filters and the RX beam from P-TRS reception for the reception of the PDCCH/PDSCH). In some cases, the discrepancy may be even larger in a multi-TRP scenario, compared with a single TRP, where, for example, SSB beams are transmitted simultaneously in a superposition manner from the multiple TRPs.

To improve the situation with large antenna arrays, the P-TRS, or TRS resource in general, may have to be associated with a beam that is as similar as possible to the demodulation reference signal (DMRS) of the PDCCH/PDSCH or P-TRS beam. However, according to NR Rel. 15 and Rel. 16 specifications this is not possible, resulting in challenges with utilizing the narrow beam for the DMRS of PDCCH/PDSCH or P-TRS.

Some embodiments described herein may provide for supporting a narrow serving beam in a hierarchical beam configuration. For example, certain embodiments may provide a UE that may receive, from a network node (e.g., a gNB), QCL configuration (including possible associations between antenna ports of a network node, including beamforming assumption, etc.) of self-contained, aperiodic, and/or semi-persistent TRSs for sub-beams, where a source for each TRS may be CSI-RS without repetition, which may be received in procedure P-2 described above. In addition, the UE may determine these TRSs as self-contained, for which there are no associated periodic TRSs, if there is a TRS configured for an SSB sub-beam. In this way, certain embodiments described herein may provide support for transmitting PDCCH and PDSCH using a more narrow beam than a SSB sub-beam that would otherwise be needed for scenarios that include a large antenna array and/or multi-TRP deployment. In addition, certain embodiments described herein may reduce signalling overhead, thereby conserving network resources (e.g., bandwidth), device resources (e.g., processing and/or computing resources associated with transmission or reception of a signal), and/or the like.

Figure 1:
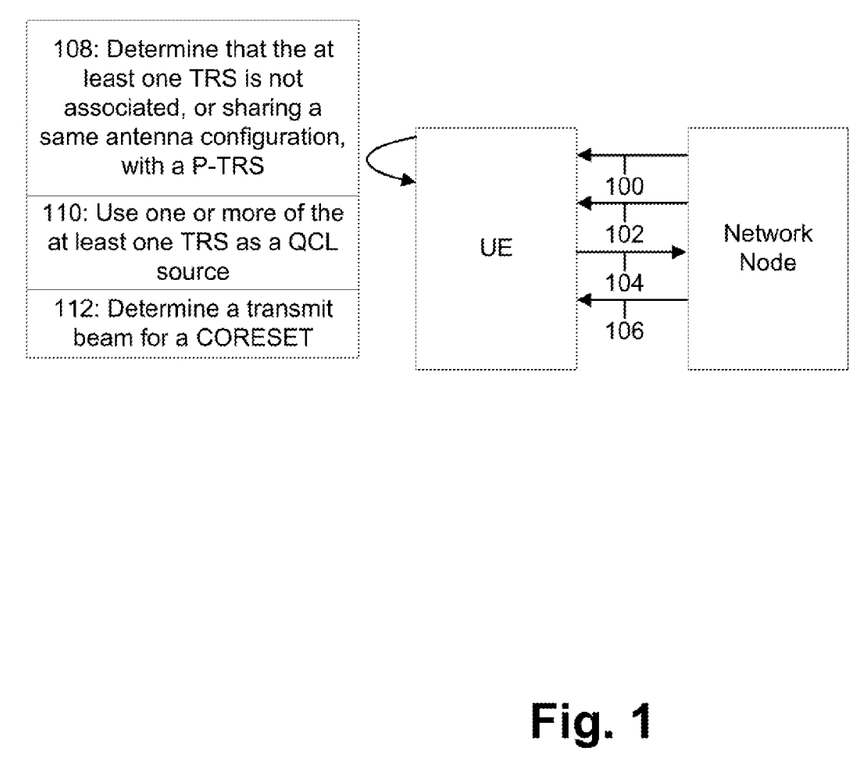
FIG. 1 illustrates an example of supporting a narrow serving beam in a hierarchical beam configuration, according to some embodiments.

FIG. 1 illustrates an example of supporting a narrow serving beam in a hierarchical beam configuration, according to some embodiments. FIG. 1 illustrates a UE and a network node (e.g., a gNB) in communication with each other.

As illustrated at 100, the UE may receive information of an antenna configuration (e.g., a QCL configuration) via a TCI state configuration for an SSB sub-beam. For example, the UE may receive information of a QCL configuration via a TCI state configuration for a set of SSB sub-beams (in spatial domain a sub-beam may be in spatial coverage of the (root) beam at the transmitter and receiver. In addition, use of a sub-beam may mean that a UE may use the same receive beam for a sub-beam as it used to receive the (root) beam). In some embodiments, the network node can configure the UE with a CSI-RS without repetition, during P-2, as a spatial QCL source for a TRS that acts as a target signal. A CSI-RS without repetition may be a CSI-RS not used for RX beam refinement (e.g., repetition may refer to transmitting multiple CSI-RS resources using a same transmit beam). This may allow the network node to transmit the SSB sub-beams using P-2 CSI-RSs to the UE. Based on which CSI-RSs the UE reports as being the desired CSI-RS(s), the network node may then configure TRSs to be transmitted using the desired sub-beams. Thus, a TRS can be transmitted using beams, which may have a more narrow width than the width of the SSB sub-beams, that can then be targeted for CSI acquisition and/or for PDCCH and/or PDSCH transmission. Root (e.g., periodic) TRSs may be configured for the set of SSB sub-beams. Each sub-beam may be characterized by a CSI-RS resource (during procedure P-2).

As illustrated at 102, the UE may receive information of a beam reporting configuration for the SSB sub-beam and a CSI-RS resource for the SSB sub-beam. For example, the UE may receive information of a beam reporting configuration for the set of SSB sub-beams (main beams) and a set of CSI-RS (received during procedure P-2) resources (e.g., the set of sub-beams of the main beams).

As illustrated at 104, the UE may provide a beam reporting of the SSB sub-beam or the CSI-RS resource for the SSB sub-beam (e.g., a beam reporting may be related to an SSB sub-beam or a CSI-RS and may relate to a reference signal received power (RSRP) metric, such as a layer 1 (L1) RSRP). For example, the UE may provide a beam reporting, which may indicate one or more of the SSB sub-beams and/or one or more of the CSI-RSs (e.g., the strongest SSB and/or CSI-RS, any SSB and/or CSI-RS where a measurement satisfies a threshold, and/or the like).

As illustrated at 106, the UE may receive information of an antenna configuration (e.g., a QCL configuration) of a TRS for the SSB sub-beam (e.g., where a source of the TRS may comprise a CSI-RS without repetition of the CSI-RS on a same sub-beam). For example, the UE may receive information of a QCL configuration of self-contained, aperiodic, and/or semi-persistent TRSs for the sub-beams, where the source for each TRS may be a CSI-RS without repetition (received during procedure P-2) (e.g., aperiodic TRS may exist if there is periodic TRS configured. Aperiodic TRS may use the same beam as periodic TRS and may be independent of periodic TRS). In some embodiments, to reduce system overhead, TRSs configured upon P-2 beams, e.g., upon more narrow beams than SSB sub-beams, may be aperiodic and/or semi-persistent and may be independent of any periodic TRS. In other words, the UE may be configured with self-contained and/or aperiodic TRS when its QCL source is CSI-RS without repetition (received during P2 and where the CSI-RS is different than the SSB). In other words, a TRS may not be associated with P-TRSs and instead may be associated with a TRS that is associated with a different QCL assumption than the P-TRS (e.g., the P-TRS may be configured upon one or more SSB sub-beams and aperiodic TRS may be configured upon one or more CSI-RSs received during procedure P-2).

There may be one or more conditions for the existence of the self-contained and/or aperiodic TRS. For example, if periodic or semi-persistent, a TRS may be configured upon an SSB sub-beam of which sub-beam a self-contained and/or aperiodic TRS may be configured. For fallback operation, e.g., in a case where the UE fails to use its receive beam towards the narrow transmit beam for the DMRS of the PDCCH and the DMRS of the PDSCH, the UE may be configured with a root TRS, described above, for each SSB sub-beam of a set of SSB sub-beams. Based on the root TRS, the UE may try to receive the DMRS of the PDCCH and the DMRS of the PDSCH transmitted using the narrow beams resulting from beam reporting on P-2 CSI-RSs (e.g., the UE may determine channel estimates for narrow beams based on a wider root beam spatially covering these narrow beams).

In some embodiments, there may be a QCL chain for UE reception. For example, a QCL chain for UE reception of, for example, PDCCH and PDSCH, may include: SSB sub-beams then CSI-RSs (during P-2) (sub-beams of the SSB sub-beams) then TRS then PDCCH DMRS/PDSCH DMRS/CSI-RS (for CSI acquisition).

As illustrated at 108, the UE may determine that the at least one TRS is not associated, or sharing a same antenna configuration, with a periodic tracking reference signal (P-TRS) (e.g., is self-contained, for which there are no associated periodic TRSs) based on the TRS being configured for the SSB sub-beam. For example, the UE may determine these TRSs as self-contained for which there are no associated periodic TRSs if there is a TRS configured for an SSB sub-beam. In some embodiments, the UE may determine the set of CSI-RSs (received during P-2) to be measured, and being potential resources for reporting, in one reporting configuration based on whether the UE has a TRS configuration having CSI-RS (received during P-2) as a QCL source (e.g., the UE may measure and report the CSI-RSs (received during P-2) as being QCL sources for the TRSs). There may be N CSI-RSs received during P-2, while for M CSI-RSs, where M<N, a TRS may be configured and the UE may provide CSI measurement for the M CSI-RSs (and not for the N CSI-RSs).

As illustrated at 110, the UE may use one or more of the at least one TRS as a QCL source for receiving a channel associated with the SSB sub-beam based on determining that at least one of the at least one TRS or at least one CSI-RS cannot be detected. For example, the UE may, in a case where the UE determines the sub-beam TRS (and CSI-RS (from P-2)) as unreliable, use a main beam (e.g., the beam providing spatial coverage for an active sub-beam intended for PDCCH and/or PDSCH transmission) TRS as a QCL source for receiving PDCCH and/or PDSCH transmission from the sub-beam. With respect to an SSB sub-beam that provides spatial coverage, a sub-beam may be within spatial coverage of an SSB sub-beam from the UE RX perspective (e.g., the UE may receive a sub-beam using the same RX beam as it used to receive the SSB sub-beam).

As illustrated at 112, the UE may determine a transmit beam for a control resource set (CORESET) to be a SSB sub-beam of an active sub-beam for another CORESET and a channel. For example, the UE may determine the transmit beam for the CORESET #0 to be the SSB sub-beam of the current active sub-beam for the CORESET #X (where X is a number other than 0) and PDSCH. In some embodiments, an active transmit beam (e.g., associated with an active TCI state) for monitoring CORESET #0 may be determined by the UE to be the SSB sub-beam (and the P-TRS configured on it) of the P-2 CSI-RS sub-beam (e.g., a sub-beam of the SSB sub-beam) that is an active transmit beam for CORESET #X. This may be a configurable option and may provide robustness for CORESET #0-based scheduling for control signaling while the narrow transmit beam may be used for other CORESETs.

In some embodiments, a beam reporting may be applied for the TRS resource sets, where the UE may be configured to report the desired CRI or set index associated with the TRS of the configured ones. In other words, the network node may configure multiple TRSs (CSI-RS resource sets with trs-info) and may transmit those using the SSB sub-beams.

In some embodiments, the network node may indicate to the UE which one of the TRS resource sets/resources is an active QCL source. There may be a new root/particular TCI state that includes one or more TRSs as a QCL source and the network node may control which one of the TRSs is an active source at any particular time. The signaling used may be downlink control information (DCI)-based or may be medium access control control element (MAC CE)-based. The root/particular TCI state may be TRP specific (e.g., it may be associated with a CORESET group index that groups CORESETs associated with the same TRP). Certain embodiments may improve the situation when the number of TCI states is limited to up to 64 and when each TRS (at least 16 in frequency range 2 (FR2)) does not have to be associated with a TCI state (e.g., would consume at least 16 out of 64 TCI states). In certain embodiments, when a beam reporting may be applied for the TRS resource sets, the QCL chain for UE reception (e.g., PDCCH and PDSCH) may be: SSB then P-TRSs (SSB sub-beams) then PDCCH DMRS/PDSCH DMRS/CSI-RS (in association with CSI acquisition).

Certain embodiments may provide a QCL type with a CSI-RS in a non-zero power CSI-RS-ResourceSet (NZP-CSI-RS-ResourceSet). For example, certain embodiments may provide a 'QCL-TypeC' with a CSI-RS resource in a NZP-CSI-RS-ResourceSet configured without the higher layer parameter trs-Info and without the higher layer parameter repetition and, when applicable, 'QCL-TypeD' with the same CSI-RS resource. These QCL types may be for a periodic CSI-RS resource in a NZP-CSI-RS-ResourceSet configured with higher layer parameter trs-Info and may be indicated in a TCI-State.

Certain embodiments may provide a QCL type with an SS/PBCH block (which may be referred to as a SSB block). For example, certain embodiments may provide a 'QCL-TypeC' with an SS/PBCH block and, when applicable, 'QCL-TypeD' with the same SS/PBCH block. These QCL types may be for a CSI-RS resource in a NZP-CSI-RS-ResourceSet configured without higher layer parameter trs-Info and without the higher layer parameter repetition, and may be indicated in a TCI-State.

As described above, FIG. 1 is provided as an example. Other examples are possible, according to some embodiments.

Figure 2:
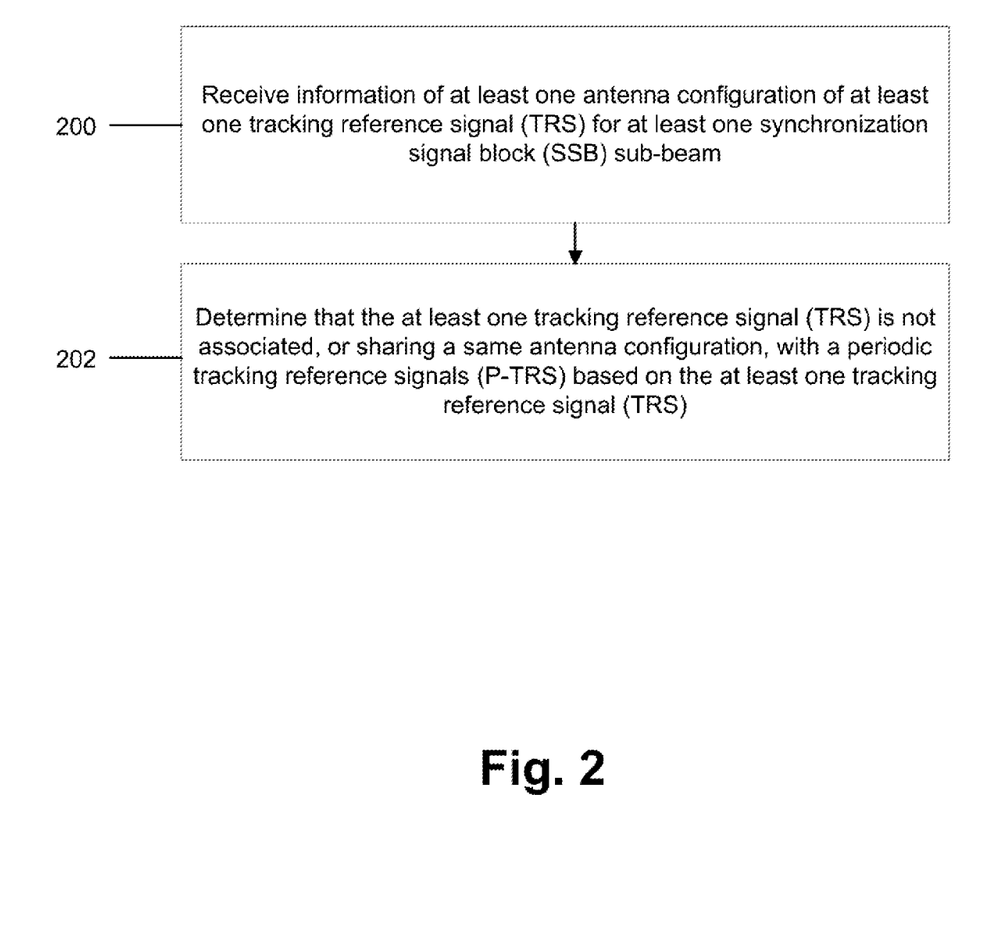
FIG. 2 illustrates an example flow diagram of a method, according to some embodiments.

FIG. 2 illustrates an example flow diagram of a method, according to some embodiments. For example, FIG. 2 shows example operations of a UE. Some of the operations illustrated in FIG. 2 may be similar to some operations shown in, and described with respect to, FIG. 1.

In an embodiment, the method may include, at 200, receiving information of at least one antenna configuration of at least one tracking reference signal (TRS) for at least one synchronization signal block (SSB) sub-beam. At least one source for the at least one tracking reference signal (TRS) may comprise at least one channel state information reference signal (CSI-RS) without repetition of the at least one channel state information reference signal (CSI-RS) on a same sub-beam. In an embodiment, the method may include, at 202, determining that the at least one tracking reference signal (TRS) is not associated, or sharing a same antenna configuration, with a periodic tracking reference signals (P-TRS) based on the at least one tracking reference signal (TRS).

In some embodiments, the at least one tracking reference signal (TRS) may be at least one of self-contained, aperiodic, or semi-persistent. In some embodiments, the method may include receiving information of at least one other antenna configuration via at least one transmission configuration indicator (TCI) state configuration for the at least one synchronization signal block (SSB) sub-beam. In some embodiments, the method may include receiving information of at least one beam reporting configuration for the at least one synchronization signal block (SSB) sub-beam and at least one channel state information reference signal (CSI-RS) resource for the at least one synchronization signal block (SSB) sub-beam. In some embodiments, the method may include providing at least one beam reporting of the at least one synchronization signal block (SSB) sub-beam or the at least one CSI-RS resource for the at least one synchronization signal block (SSB) sub-beam.

In some embodiments, the method may include using one or more of the at least one tracking reference signal (TRS) as at least one quasi co-location (QCL) source for receiving at least one channel associated with the at least one synchronization signal block (SSB) sub-beam based on determining that at least one of: the at least one tracking reference signal (TRS) or the at least one channel state information reference signal (CSI-RS) cannot be detected. In some embodiments, the at least one tracking reference signal (TRS) may spatially cover at least one active sub-beam associated with reception of the at least one channel at the user equipment (UE). In some embodiments, the at least one channel may comprise at least one physical downlink control channel (PDCCH) or at least one physical downlink shared channel (PDSCH). In some embodiments, the method may include determining at least one transmit beam for at least one control resource set (CORESET) to be at least one synchronization signal block (SSB) sub-beam of at least one active sub-beam for at least one other control resource set (CORESET) and at least one channel. In some embodiments, the at least one antenna configuration or the at least one other antenna configuration may comprise at least one quasi co-location (QCL) configuration.

As described above, FIG. 2 is provided as an example. Other examples are possible according to some embodiments.

Figure 3:
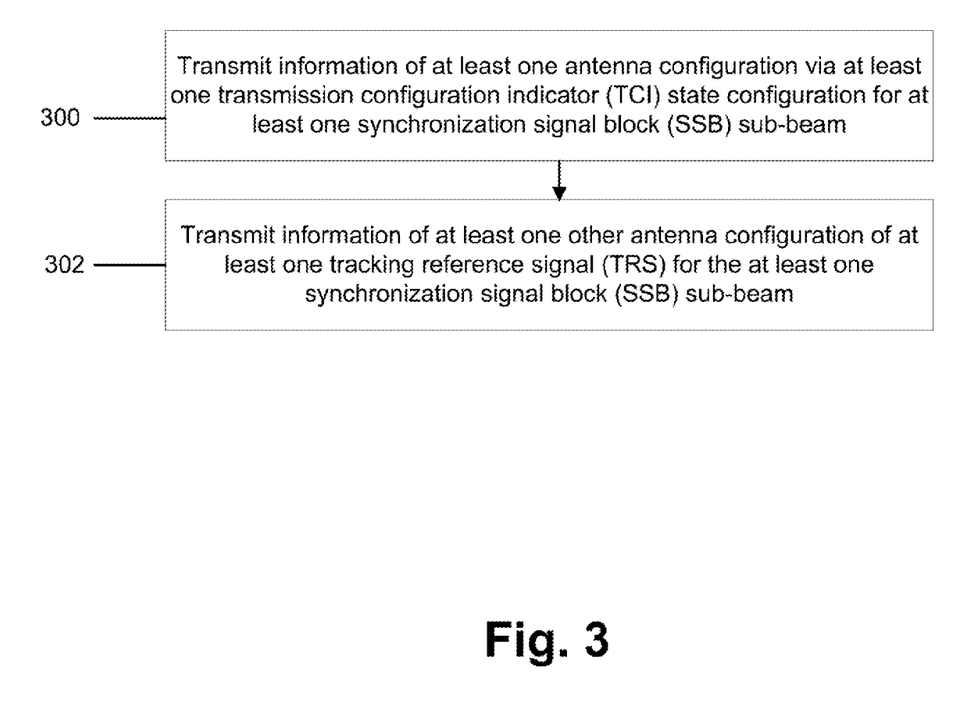
FIG. 3 illustrates an example flow diagram of a method, according to some embodiments.

FIG. 3 illustrates an example flow diagram of a method, according to some embodiments. For example, FIG. 3 shows example operations of a network node. Some of the operations illustrated in FIG. 3 may be similar to some operations shown in, and described with respect to, FIG. 1.

In an embodiment, the method may include, at 300, transmitting information of at least one antenna configuration via at least one transmission configuration indicator (TCI) state configuration for at least one synchronization signal block (SSB) sub-beam. In an embodiment, the method may include, at 302, transmitting information of at least one other antenna configuration of at least one tracking reference signal (TRS) for the at least one synchronization signal block (SSB) sub-beam. At least one source for the at least one tracking reference signal (TRS) may comprise at least one channel state information reference signal (CSI-RS) without repetition of the at least one channel state information reference signal (CSI-RS) on a same sub-beam. The at least one tracking reference signal (TRS) may not be associated, or sharing a same antenna configuration, with a periodic tracking reference signal (P-TRS).

In some embodiments, the at least one tracking reference signal (TRS) may be at least one of self-contained, aperiodic, or semi-persistent. In some embodiments, the method may include transmitting information of at least one beam reporting configuration for the at least one synchronization signal block (SSB) sub-beam and at least one channel state information reference signal (CSI-RS) resource for the at least one synchronization signal block (SSB) sub-beam. In some embodiments, the method may include receiving at least one beam reporting of the at least one synchronization signal block (SSB) sub-beam or the at least one CSI-RS for the at least one synchronization signal block (SSB) sub-beam. In some embodiments, the at least one tracking reference signal (TRS) may spatially cover at least one active sub-beam associated with transmission of at least one channel.

In some embodiments, the at least one channel may comprise at least one physical downlink control channel (PDCCH) or at least one physical downlink shared channel (PDSCH). In some embodiments, the antenna configuration or the other antenna configuration of the at least one tracking reference signal (TRS) for the at least one synchronization signal block (SSB) sub-beam may comprise at least one quasi co-location (QCL) configuration.

As described above, FIG. 3 is provided as an example. Other examples are possible according to some embodiments.

Figure 4A:
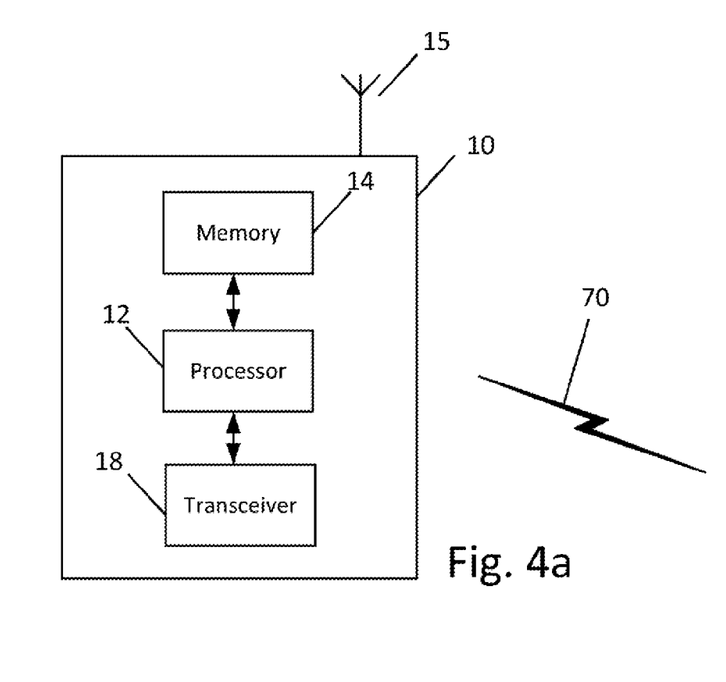
FIG. 4a illustrates an example block diagram of an apparatus, according to an embodiment.

FIG. 4a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations of flow or signaling diagrams illustrated in FIG. 1.

For instance, in one embodiment, apparatus 10 may be controlled by memory 14 and processor 12 to transmit information of at least one antenna configuration via at least one transmission configuration indicator (TCI) state configuration for at least one synchronization signal block (SSB) sub-beam. In one embodiment, apparatus 10 may be controlled by memory 14 and processor 12 to transmitting information of at least one other antenna configuration of at least one tracking reference signal (TRS) for the at least one synchronization signal block (SSB) sub-beam. At least one source for the at least one tracking reference signal (TRS) may comprise at least one channel state information reference signal (CSI-RS) without repetition of the at least one channel state information reference signal (CSI-RS) on a same sub-beam. The at least one tracking reference signal (TRS) may not be associated, or sharing a same antenna configuration, with a periodic tracking reference signal (P-TRS).

Figure 4B:
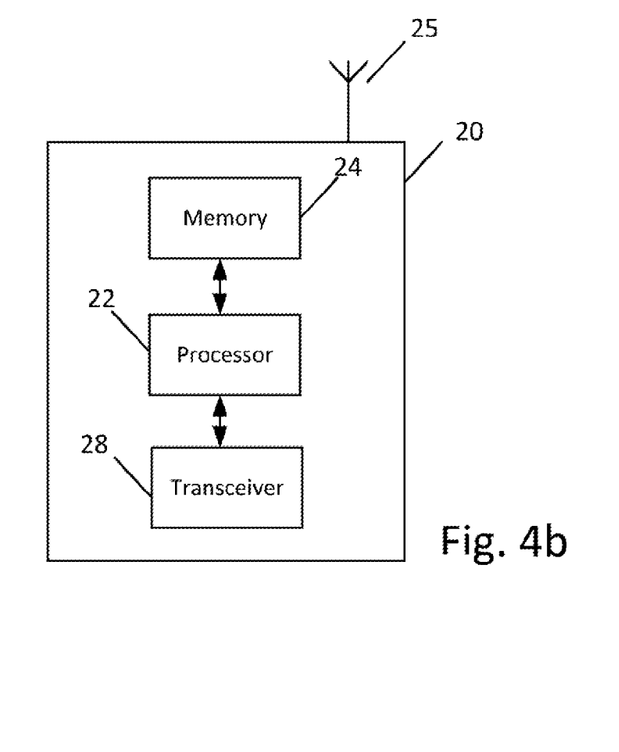
FIG. 4b illustrates an example block diagram of an apparatus, according to another embodiment.

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1.

For instance, in one embodiment, apparatus 20 may be controlled by memory 24 and processor 22 to receive information of at least one antenna configuration of at least one tracking reference signal (TRS) for at least one synchronization signal block (SSB) sub-beam. At least one source for the at least one tracking reference signal (TRS) may comprise at least one channel state information reference signal (CSI-RS) without repetition of the at least one channel state information reference signal (CSI-RS) on a same sub-beam. In one embodiment, apparatus 20 may be controlled by memory 24 and processor 22 to determine that the at least one tracking reference signal (TRS) is not associated, or sharing a same antenna configuration, with a periodic tracking reference signals (P-TRS) based on the at least one tracking reference signal (TRS).

Therefore, certain example embodiments provide several technological improvements, enhancements, and/or advantages over existing technological processes. For example, some benefits of some example embodiments include providing use of a more narrow beam than a SSB sub-beam that would otherwise be needed for scenarios that include a large antenna array and multi-TRP deployment and/or a reduction in signalling overhead. Accordingly, the use of some example embodiments results in improved functioning of communications networks and their nodes and, therefore constitute an improvement at least to the technological field of signaling beam usage, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

According to a first embodiment, a method may include receiving information of at least one antenna configuration of at least one tracking reference signal (TRS) for at least one synchronization signal block (SSB) sub-beam. At least one source for the at least one tracking reference signal (TRS) may comprise at least one channel state information reference signal (CSI-RS) without repetition of the at least one channel state information reference signal (CSI-RS) on a same sub-beam. The method may include determining that the at least one tracking reference signal (TRS) is not associated, or sharing a same antenna configuration, with a periodic tracking reference signals (P-TRS) based on the at least one tracking reference signal (TRS).

In a variant, the at least one tracking reference signal (TRS) may be at least one of self-contained, aperiodic, or semi-persistent. In a variant, the method may include receiving information of at least one other antenna configuration via at least one transmission configuration indicator (TCI) state configuration for the at least one synchronization signal block (SSB) sub-beam. In a variant, the method may include receiving information of at least one beam reporting configuration for the at least one synchronization signal block (SSB) sub-beam and at least one channel state information reference signal (CSI-RS) resource for the at least one synchronization signal block (SSB) sub-beam. In a variant, the method may include providing at least one beam reporting of the at least one synchronization signal block (SSB) sub-beam or the at least one CSI-RS resource for the at least one synchronization signal block (SSB) sub-beam.

In a variant, the method may include using one or more of the at least one tracking reference signal (TRS) as at least one quasi co-location (QCL) source for receiving at least one channel associated with the at least one synchronization signal block (SSB) sub-beam based on determining that at least one of: the at least one tracking reference signal (TRS) or the at least one channel state information reference signal (CSI-RS) cannot be detected. In a variant, the at least one tracking reference signal (TRS) may spatially cover at least one active sub-beam associated with reception of the at least one channel at the user equipment (UE). In a variant, the at least one channel may comprise at least one physical downlink control channel (PDCCH) or at least one physical downlink shared channel (PDSCH). In a variant, the method may include determining at least one transmit beam for at least one control resource set (CORESET) to be at least one synchronization signal block (SSB) sub-beam of at least one active sub-beam for at least one other control resource set (CORESET) and at least one channel. In a variant, the at least one antenna configuration or the at least one other antenna configuration may comprise at least one quasi co-location (QCL) configuration.

According to a second embodiment, a method may include transmitting information of at least one antenna configuration via at least one transmission configuration indicator (TCI) state configuration for at least one synchronization signal block (SSB) sub-beam. The method may include transmitting information of at least one other antenna configuration of at least one tracking reference signal (TRS) for the at least one synchronization signal block (SSB) sub-beam. At least one source for the at least one tracking reference signal (TRS) may comprise at least one channel state information reference signal (CSI-RS) without repetition of the at least one channel state information reference signal (CSI-RS) on a same sub-beam. The at least one tracking reference signal (TRS) may not be associated, or sharing a same antenna configuration, with a periodic tracking reference signal (P-TRS).

In a variant, the at least one tracking reference signal (TRS) may be at least one of self-contained, aperiodic, or semi-persistent. In a variant, the method may include transmitting information of at least one beam reporting configuration for the at least one synchronization signal block (SSB) sub-beam and at least one channel state information reference signal (CSI-RS) resource for the at least one synchronization signal block (SSB) sub-beam. In a variant, the method may include receiving at least one beam reporting of the at least one synchronization signal block (SSB) sub-beam or the at least one CSI-RS for the at least one synchronization signal block (SSB) sub-beam. In a variant, the at least one tracking reference signal (TRS) may spatially cover at least one active sub-beam associated with transmission of at least one channel.

In a variant, the at least one channel may comprise at least one physical downlink control channel (PDCCH) or at least one physical downlink shared channel (PDSCH). In a variant, the antenna configuration or the other antenna configuration of the at least one tracking reference signal (TRS) for the at least one synchronization signal block (SSB) sub-beam may comprise at least one quasi co-location (QCL) configuration.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to perform the method according to the first embodiment or the second embodiment, or any of the variants discussed above.

A fifth embodiment may be directed to an apparatus that may include means for performing the method according to the first embodiment or the second embodiment, or any of the variants discussed above.

A sixth embodiment may be directed to a computer readable medium comprising program instructions stored thereon for performing at least the method according to the first embodiment or the second embodiment, or any of the variants discussed above.

A seventh embodiment may be directed to a computer program product encoding instructions for performing at least the method according to the first embodiment or the second embodiment, or any of the variants discussed above.

PARTIAL GLOSSARY

CE Control Element
CORESET Control Resource Set

CSI-RS Channel State Information Reference Signal
DL Downlink
MAC Medium Access Control
NZP Non-Zero Power
PBCH Physical Broadcast Channel
P-CSI-RS Periodic CSI-RS
PDCCH Physical Downlink Control Channel
PDSCH Physical Downlink Shared Channel
QCL Quasi Co-location
RRC Radio Resource Control
RS Reference Signal
SSB Synchronization Signal and PBCH Block or Synchronization Signal Block
TRP Tansmission and Reception Point
TRS Tracking Reference Signal
UE User Equipment
UL Uplink

We claim:

1. An apparatus, comprising:
at least one processor; and
at least one memory including computer program code, wherein the at least one memory and the computer program code are configured to, with the at least one processor, cause the apparatus at least to:
receive information of at least one antenna configuration of at least one tracking reference signal for at least one synchronization signal block sub-beam, wherein the at least one tracking reference signal is self-contained, aperiodic, and semi-persistent, and wherein at least one source for the at least one tracking reference signal comprises at least one channel state information reference signal without repetition of the at least one channel state information reference signal on a same sub-beam;
determine that the at least one tracking reference signal is not associated, or sharing a same antenna configuration, with a periodic tracking reference signals based on the at least one tracking reference signal;
receive information of at least one other antenna configuration via at least one transmission configuration indicator state configuration for the at least one synchronization signal block sub-beam, wherein the at least one antenna configuration or the at least one other antenna configuration includes at least one quasi co-location configuration; and
use one or more of the at least one tracking reference signal as at least one quasi co-location source for receiving at least one channel associated with the at least one synchronization signal block sub-beam based on determining that:
the at least one tracking reference signal and the at least one channel state information reference signal cannot be detected,
wherein the at least one channel includes at least one physical downlink control channel and at least one physical downlink shared channel.

* * * * *